F. MYERS.
BRAKE MECHANISM.
APPLICATION FILED JUNE 1, 1915.
1,175,286.
Patented Mar. 14, 1916.
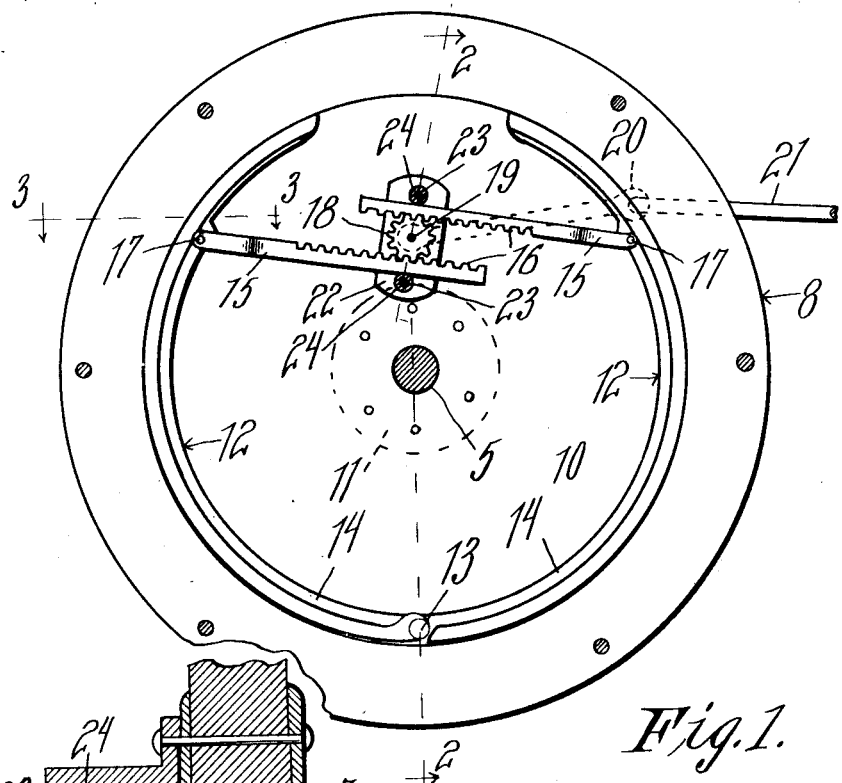
Fig. 1.
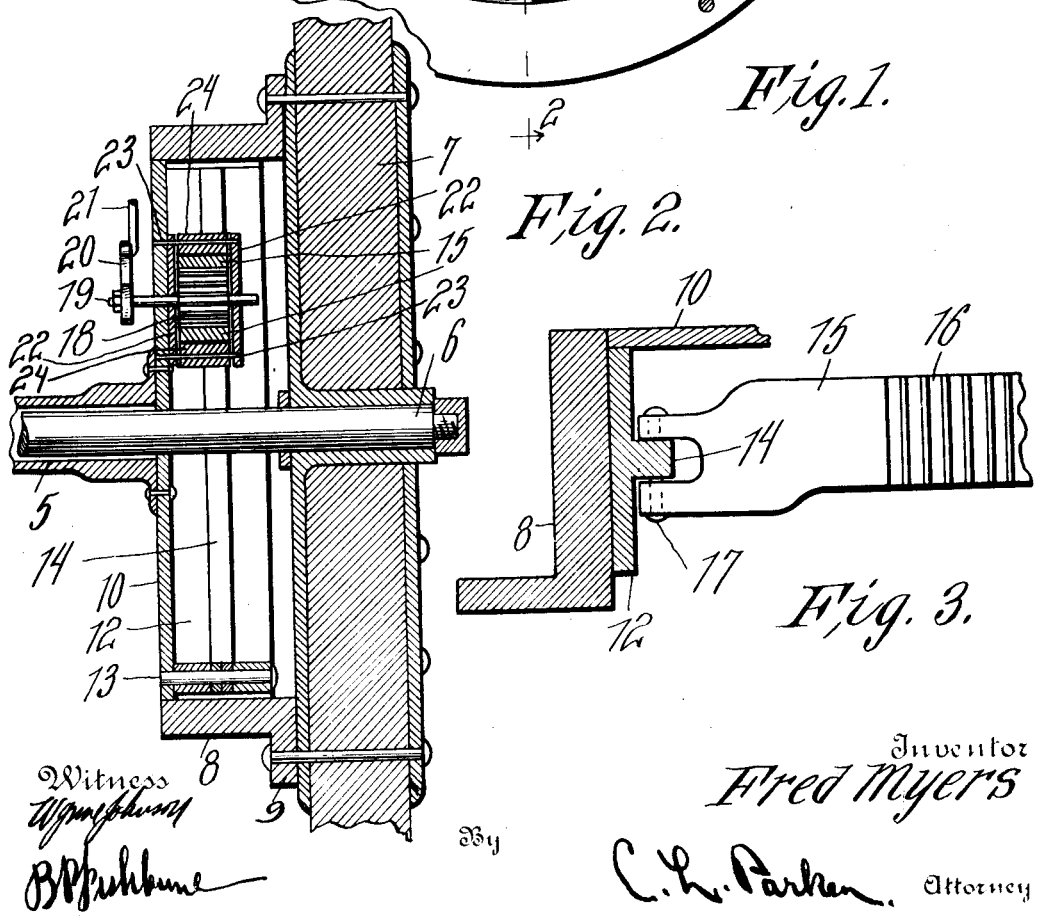
Fig. 2.
Fig. 3.
Inventor
Fred Myers
Witness
By
C. L. Parker, Attorney

UNITED STATES PATENT OFFICE.

FRED MYERS, OF COLUMBIA, KENTUCKY.

BRAKE MECHANISM.

1,175,286.  Specification of Letters Patent.  Patented Mar. 14, 1916.

Application filed June 1, 1915. Serial No. 31,502.

*To all whom it may concern:*

Be it known that I, FRED MYERS, a citizen of the United States, residing at Columbia, in the county of Adair and State of Kentucky, have invented certain new and useful Improvements in Brake Mechanism, of which the following is a specification.

My invention relates to improvements in brake means, adapted for use upon vehicles, such as automobiles or the like.

An important object of the invention is to provide brake means of the above mentioned character, which are simple in construction, inexpensive to manufacture, and powerful and reliable in operation.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, Fig. 2 is a transverse sectional view taken on line 2—2 of Fig. 1, and, Fig. 3 is an enlarged detail section taken on line 3—3 of Fig. 1.

In the drawings, wherein for the purpose of illustration is shown a preferred embodiment of my invention, the numeral 5 designates a rear axle casing of an automobile, within which is rotatably mounted an axle section 6, as is customary. Rigidly connected with the axle section 6 is a rear wheel 7.

My improved brake means comprises a rotatable rim or drum 8, having a flange 9, which is bolted or otherwise rigidly secured to the spokes of the wheel 7, for rotation therewith. Arranged within the rim or drum 8 is an end or head 10, bolted or otherwise rigidly attached to the stationary axle casing 5, to be held against rotation thereby.

The numeral 12 designates a pair of longitudinally curved brake shoes, pivotally connected with the end of head 10, as shown at 13. The opposite ends of these brake shoes are spaced, as shown. The brake shoes 12 are provided upon their inner sides with longitudinal stiffening ribs or flanges 14.

The numeral 15 designates rack-bars, having teeth 16. The outer ends of these rack-bars are preferably forked, as shown in Fig. 3, to straddle the ribs or flange 14 and are pivotally connected therewith by bolts 17 or the like. Arranged between the rack-bars 15 and engaging the teeth thereof is a pinion 18, rigidly mounted upon a rock-shaft 19, journaled through the end or head 10, as shown. The rock-shaft 19 is turned by a crank 20, having connection with a link 21, which leads to the brake pedal or lever. The rock-shaft 19 is also journaled through plates 22, secured to the head 10 by bolts 23 disposed above and below the rack-bars 15. These bolts preferably carry guide rollers 24, as shown.

In the operation of the apparatus, when it is desired to apply the brakes the crank 20 is swung forwardly, turning the pinion 18 clockwise. This movement of the pinion shifts the upper rack-bar 15 to the right, and the lower rack-bar 15 to the left, whereby the brake shoes 12 are moved outwardly to have frictional contact with the ring or drum 8, for retarding its rotation.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In brake mechanism of the character described, a relatively stationary member, a drum arranged near the member for rotation with relation thereto, brake shoes arranged within the drum to contact therewith and pivotally connected with the member, a shaft carried by the member and extending into the drum, means to turn the shaft, a pinion arranged within the drum and carried by the shaft to be rotated thereby, rack-bars engaging opposite sides of the pinion and pivotally connected with the brake shoes near their free ends and arranged within the drum, and guide elements connected with the member and contacting with the outer sides of the rack-bars to retain them in engagement with the pinion.

2. In brake mechanism of the character described, a head, a drum arranged near the head and adapted to have rotary movement with relation thereto, brake shoes arranged within the drum and pivotally connected with the head and provided upon their inner sides with longitudinal stiffening ribs, a shaft journaled through the head and extending into the drum, a pinion mounted upon the shaft and arranged within the drum, rack-bars having their outer ends forked to straddle the ribs of the brake shoes and pivotally connected therewith and their inner ends engaging opposite sides of the pinion, and guide means arranged upon the outer sides of the rack-bars.

In testimony whereof I affix my signature in presence of two witnesses.

FRED MYERS.

Witnesses:
   Jno. W. Flower,
   Rollin Cuncliff.